(12) United States Patent
Goyal et al.

(10) Patent No.: US 8,239,391 B2
(45) Date of Patent: Aug. 7, 2012

(54) HIERARCHICAL MERGING FOR OPTIMIZED INDEX

(75) Inventors: Jay Kumar Goyal, Bellevue, WA (US);
Neil Sharman, Sammamish, WA (US);
Vibhaakar Sharma, Redmond, WA (US); Vinay Sudhir Deshpande, Bellevue, WA (US); Utkarsh Jain, Bellevue, WA (US); Gaurav Sareen, Sammamish, WA (US); Yinzhe Yu, Bellevue, WA (US); Daniel Yuan, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 203 days.

(21) Appl. No.: 12/835,396

(22) Filed: Jul. 13, 2010

(65) Prior Publication Data

US 2012/0016864 A1 Jan. 19, 2012

(51) Int. Cl.
*G06F 7/00* (2006.01)
(52) U.S. Cl. ...................................... 707/746
(58) Field of Classification Search .................. 707/696, 707/711, 741, 746, 830
See application file for complete search history.

(56) References Cited

U.S. PATENT DOCUMENTS

| | | | | |
|---|---|---|---|---|
| 5,303,379 | A * | 4/1994 | Khoyi et al. | 717/166 |
| 5,685,003 | A * | 11/1997 | Peltonen et al. | 715/202 |
| 5,806,021 | A * | 9/1998 | Chen et al. | 704/9 |
| 5,852,820 | A | 12/1998 | Burrows | |
| 6,169,983 | B1 | 1/2001 | Chaudhuri | |
| 7,185,019 | B2 * | 2/2007 | Nayak | 707/690 |
| 7,240,069 | B2 * | 7/2007 | Samsonov | 1/1 |
| 7,590,645 | B2 | 9/2009 | Nayak | |
| 7,676,513 | B2 | 3/2010 | McSherry et al. | |
| 7,685,145 | B2 | 3/2010 | Bruno et al. | |
| 7,730,070 | B2 * | 6/2010 | Hoernkvist | 707/741 |
| 7,792,839 | B2 * | 9/2010 | Hrle et al. | 707/741 |
| 7,984,089 | B2 * | 7/2011 | Gates et al. | 707/830 |
| 2005/0198076 | A1 | 9/2005 | Stata | |
| 2006/0053163 | A1 * | 3/2006 | Liu et al. | 707/104.1 |
| 2007/0255771 | A1 * | 11/2007 | Inoue et al. | 707/205 |
| 2008/0195584 | A1 * | 8/2008 | Nath et al. | 707/3 |

OTHER PUBLICATIONS

Stefan Buttcher, "Multi-User File System Search," 2007, 232 pp., Waterloo, Ontario, Canada.
Krishna Nareddy, "Introduction to Microsoft Index Server," Oct. 15, 1997, 9 pp., Microsoft Corporation, Seattle, Washington.
"Blog—Stack Overflow," Oct. 2009, http://blog.stackoverflow.com/2008/11/sql-2008-full-text-search-problems/.

* cited by examiner

*Primary Examiner* — Robert Timblin
(74) *Attorney, Agent, or Firm* — Shook, Hardy & Bacon L.L.P.

(57) ABSTRACT

Methods, systems, and media are provided for an optimized search engine index. The optimized index is formed by merging small lower level indexes of fresh documents together into a hierarchical cluster of multiple higher level indexes. The optimized index of fresh documents is formed via a single threaded process, while a fresh index serving platform concurrently serves fresh queries. The hierarchy of higher level indexes is formed by merging lower and/or higher level indexes with similar expiration times together. Therefore, as some indexes expire, the remaining un-expired indexes can be re-used and merged with new incoming indexes. The single threaded process provides fast serving of fresh documents, while also providing time to integrate the fresh indexes into a long term primary search engine index, prior to expiring.

20 Claims, 6 Drawing Sheets

HIERARCHICAL MERGING FOR OPTIMIZED INDEX

BACKGROUND

In order to provide more complete, accurate, and timely query responses, a search engine will create indexes for all of the documents present. Many indexes will index every word in a document; therefore, the index is much larger than the size of the document. For all documents that are present within a search engine, an optimized index can be created offline, and then served.

A search engine receives fresh documents continuously. Therefore, updating the optimized index for each received fresh document would require taking the index offline constantly. In order to avoid this, small indexes of fresh documents can be created, which require much less processing time. However, serving a large number of small indexes causes performance degradation, high latencies, and less effective use of hardware. A complete index merge takes a large amount of time. In addition, a completely new index needs to be created for each change, even when the change is relatively minor.

SUMMARY

Embodiments of the invention are defined by the claims below. A high-level overview of various embodiments of the invention is provided to introduce a summary of the systems, methods, and media that are further described in the detailed description section below. This summary is neither intended to identify key features or essential features of the claimed subject matter, nor is it intended to be used as an aid in isolation to determine the scope of the claimed subject matter.

Embodiments of the invention include systems comprising an optimized index formed by merging small lower level indexes of fresh documents together into a hierarchical cluster of higher level indexes. The optimized index of fresh documents is formed via a single threaded process, while a fresh index serving platform concurrently serves fresh queries. The hierarchy of higher level indexes is formed by merging lower and/or higher level indexes with similar expiration times together. Therefore, as some indexes expire, the remaining un-expired indexes can be re-used. The single threaded process provides fast serving of fresh documents with minimal impact on system resources. The single threaded process also provides time to integrate the fresh indexes into a long term primary search engine index, prior to expiring.

Other embodiments of the invention include methods of receiving fresh documents and serving queries, while simultaneously forming a hierarchy of higher level indexes of the fresh documents. The fresh documents are grouped into multiple lower level indexes according to certain criteria. Two or more lower level indexes with proximally close expiration times are merged into a second level index. Two second level indexes, or one lower level index and one second level index, can be merged to form a third level index. The newer indexes will be merged more frequently, and therefore reach a higher level within the hierarchy, since they have a longer time prior to expiration. An index that is about to expire should not be merged with another index, since all indexes that merge together will be deleted when a single merged index expires. All indexes will have a length of time prior to expiration that allows adequate time for integration with a long term primary search engine index.

Other embodiments of the invention include computer-readable media, having instructions stored thereon, that when executed by a computing device, perform the above-described methods.

BRIEF DESCRIPTION OF THE DRAWINGS

Illustrative embodiments of the invention are described in detail below, with reference to the attached drawing figures, which are incorporated by reference herein, and wherein.

DETAILED DESCRIPTION

Figure 1:
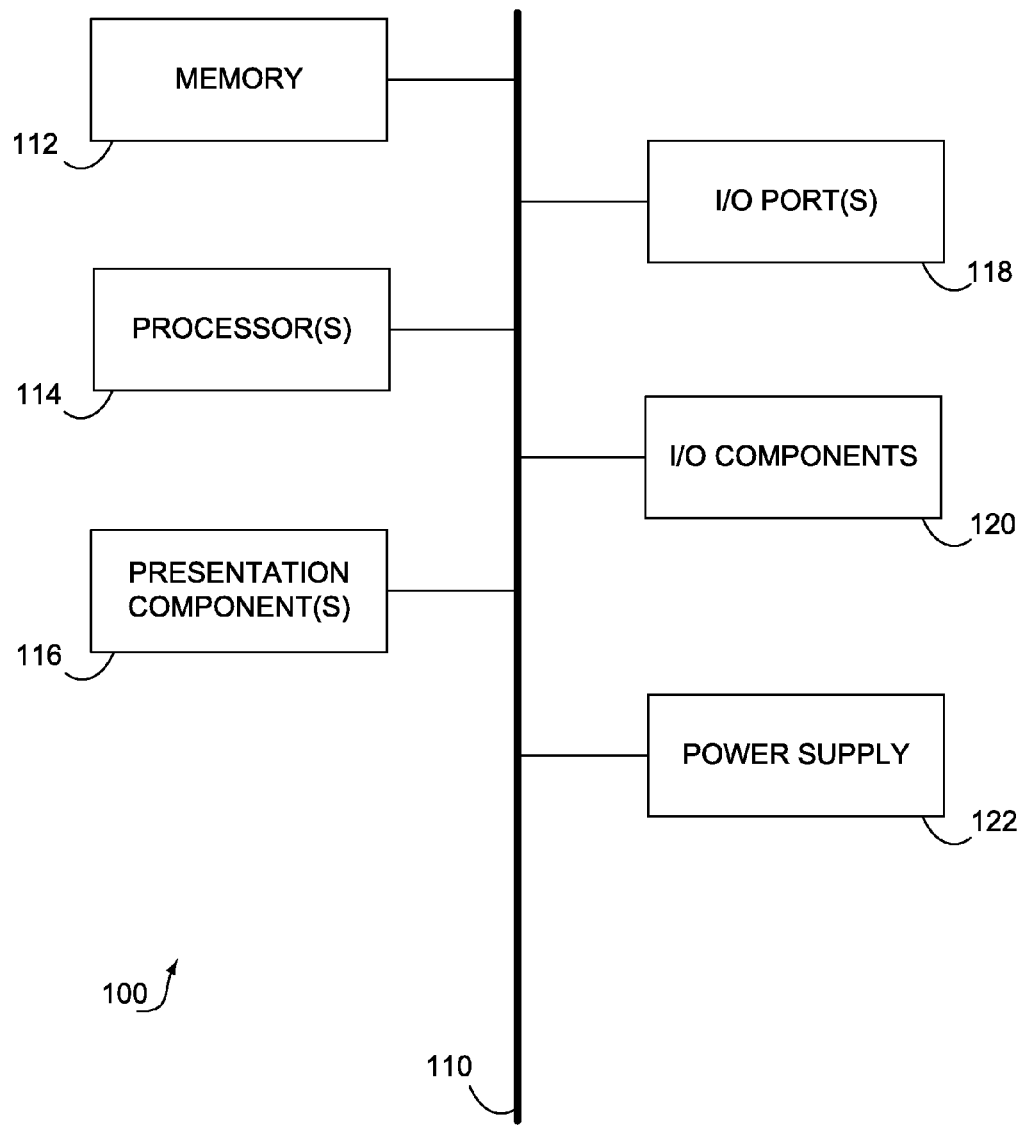
FIG. 1 is a block diagram illustrating an exemplary computer operating environment used in accordance with embodiments of the invention.

Embodiments of the invention provide systems, methods and computer-readable storage media for hierarchical merging of search query indexes. This detailed description and the following claims satisfy the applicable statutory requirements.

The terms "step," "block," etc. might be used herein to connote different acts of methods employed, but the terms should not be interpreted as implying any particular order, unless the order of individual steps, blocks, etc. is explicitly described. Likewise, the term "module," etc. might be used herein to connote different components of systems employed, but the terms should not be interpreted as implying any particular order, unless the order of individual modules, etc. is explicitly described.

Embodiments of the invention include, without limitation, methods, systems, and sets of computer-executable instructions embodied on one or more computer-readable media. Computer-readable media include both volatile and nonvolatile media, removable and non-removable media, and media readable by a database and various other network devices. By way of example, and not limitation, computer-readable storage media comprise media implemented in any method or technology for storing information. Examples of stored information include computer-useable instructions, data structures, program modules, and other data representations. Media examples include, but are not limited to, information-delivery media, random access memory (RAM), read-only memory (ROM), electrically erasable programmable read-only memory (EEPROM), flash memory or other memory technology, compact-disc read-only memory (CD-ROM), digital versatile discs (DVD), holographic media or other optical disc storage, magnetic cassettes, magnetic tape, magnetic disk storage, and other magnetic storage devices. These examples of media can be configured to store data momentarily, temporarily, or permanently. The computer-readable media include cooperating or interconnected computer-readable media, which exist exclusively on a processing system or distributed among multiple interconnected processing systems that may be local to, or remote from, the processing system.

Embodiments of the invention may be described in the general context of computer code or machine-useable instructions, including computer-executable instructions such as program modules, being executed by a computing system, or other machine or machines. Generally, program modules including routines, programs, objects, components, data structures, and the like refer to code that perform particular tasks or implement particular data types. Embodiments described herein may be implemented using a variety of system configurations, including handheld devices, consumer electronics, general-purpose computers, more specialty computing devices, etc. Embodiments described herein may also be implemented in distributed computing environments, using remote-processing devices that are linked through a communications network or the Internet.

In some embodiments, a computer-implemented method of simultaneously serving queries and indexing fresh documents is described. An incoming stream of fresh documents is received and grouped into first level indexes according to uniform document identifiers. At least two of the first level indexes having similar expiration times are merged into a second level index. At least two of the younger second level indexes are merged into a third level index. Any expired first level indexes are disposed of, as well as all higher level indexes which comprise the expired first level index. A new first level index is added, then a new higher level index is formed by merging the new first level index with an existing index. The new higher level index is then served to a fresh index serving platform.

In other embodiments, a computer-implemented indexing system is described. A fresh index serving platform receives an incoming stream of fresh documents and simultaneously serves fresh queries. A plurality of lower level indexes, comprising the fresh documents are grouped according to uniform document identifiers and expiration times. One or more higher level indexes are formed by merging two or more lower level indexes, which are then served to the fresh index serving platform. A hierarchical clustering of the plurality of lower level indexes and the one or more higher level indexes are merged via a single threaded merge system. A search engine indexing system comprises expired indexes from the hierarchical clustering integrated with existing search engine indexes to form a long term primary index.

In yet other embodiments, one or more computer-readable storage media containing computer readable instructions embodied thereon that, when executed by a computing device, perform a method of optimizing a search engine index is described. An incoming stream of fresh documents are received, then grouped into a plurality of lower level indexes according to their respective expiration times. Some of the lower level indexes are merged together to form a hierarchy of higher level indexes, wherein younger indexes are merged to a higher level within the hierarchy and soon-to-expire indexes are not merged with other indexes. Any expired indexes are disposed of, along with all higher level indexes which comprise the expired indexes. One or more new lower level indexes are added, which are merged with one or more of the younger indexes within the hierarchy.

Having briefly described a general overview of the embodiments herein, an exemplary computing device is described below. Referring initially to FIG. 1, an exemplary operating environment for implementing embodiments of the present invention is shown and designated generally as computing device 100. The computing device 100 is but one example of a suitable computing system and is not intended to suggest any limitation as to the scope of use or functionality of embodiments of the invention. Neither should the computing device 100 be interpreted as having any dependency or requirement relating to any one or combination of components illustrated. In one embodiment, the computing device 100 is a conventional computer (e.g., a personal computer or laptop). Embodiments of the invention are also applicable to a plurality of interconnected computing devices, such as computing devices 100.

The computing device 100 includes a bus 110 that directly or indirectly couples the following devices: memory 112, one or more processors 114, one or more presentation components 116, input/output (I/O) ports 118, input/output components 120, and an illustrative power supply 122. The bus 110 represents what may be one or more busses (such as an address bus, data bus, or combination thereof). Although the various blocks of FIG. 1 are shown with lines for the sake of clarity, delineating various components in reality is not so clear, and metaphorically, the lines would more accurately be gray and fuzzy. For example, one may consider a presentation component 116 such as a display device to be an I/O component 120. Also, processors 114 have memory 112. It will be understood by those skilled in the art that such is the nature of the art, and as previously mentioned, the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1, and are referenced as "computing device" or "computing system."

The computing device 100 can include a variety of computer-readable media. By way of example, and not limitation, computer-readable media may comprise RAM, ROM, EEPROM, flash memory or other memory technologies, CDROM, DVD or other optical or holographic media, magnetic cassettes, magnetic tape, magnetic disk storage or other magnetic storage devices, or similar tangible media that are configurable to store data and/or instructions relevant to the embodiments described herein.

The memory 112 includes computer-storage media in the form of volatile and/or nonvolatile memory. The memory 112 may be removable, non-removable, or a combination thereof. Exemplary hardware devices include solid-state memory, hard drives, cache, optical-disc drives, etc. The computing device 100 includes one or more processors 114, which read data from various entities such as the memory 112 or the I/O components 120. The presentation components 116 present data indications to a user or other device. Exemplary presentation components 116 include display devices, speaker devices, printing devices, vibrating devices, and the like.

The I/O ports 118 logically couple the computing device 100 to other devices including the I/O components 120, some of which may be built in. Illustrative I/O components 120 include a microphone, joystick, game pad, satellite dish, scanner, printer, wireless device, etc.

The components described above in relation to the computing device 100 may also be included in a wireless device. A wireless device, as described herein, refers to any type of wireless phone, handheld device, personal digital assistant (PDA), BlackBerry®, smartphone, digital camera, or other mobile devices (aside from a laptop), which communicate wirelessly. One skilled in the art will appreciate that wireless devices will also include a processor and computer-storage media, which perform various functions. Embodiments described herein are applicable to both a computing device and a wireless device. In embodiments, computing devices can also refer to devices which run applications of which images are captured by the camera in a wireless device.

The computing system described above is configured to be used with the several computer-implemented methods, systems, and media generally described above and described in more detail hereinafter. The embodiments of the invention provide computer-implemented methods, systems, and media of indexing fresh documents while simultaneously serving queries. This objective is achieved by utilizing a single threaded merge process while still serving queries, which has a low impact on index serving performance. In addition, previously formed indexes are re-used with newly formed indexes, thereby avoiding the necessity of creating an entirely new index with every change.

Figure 2:
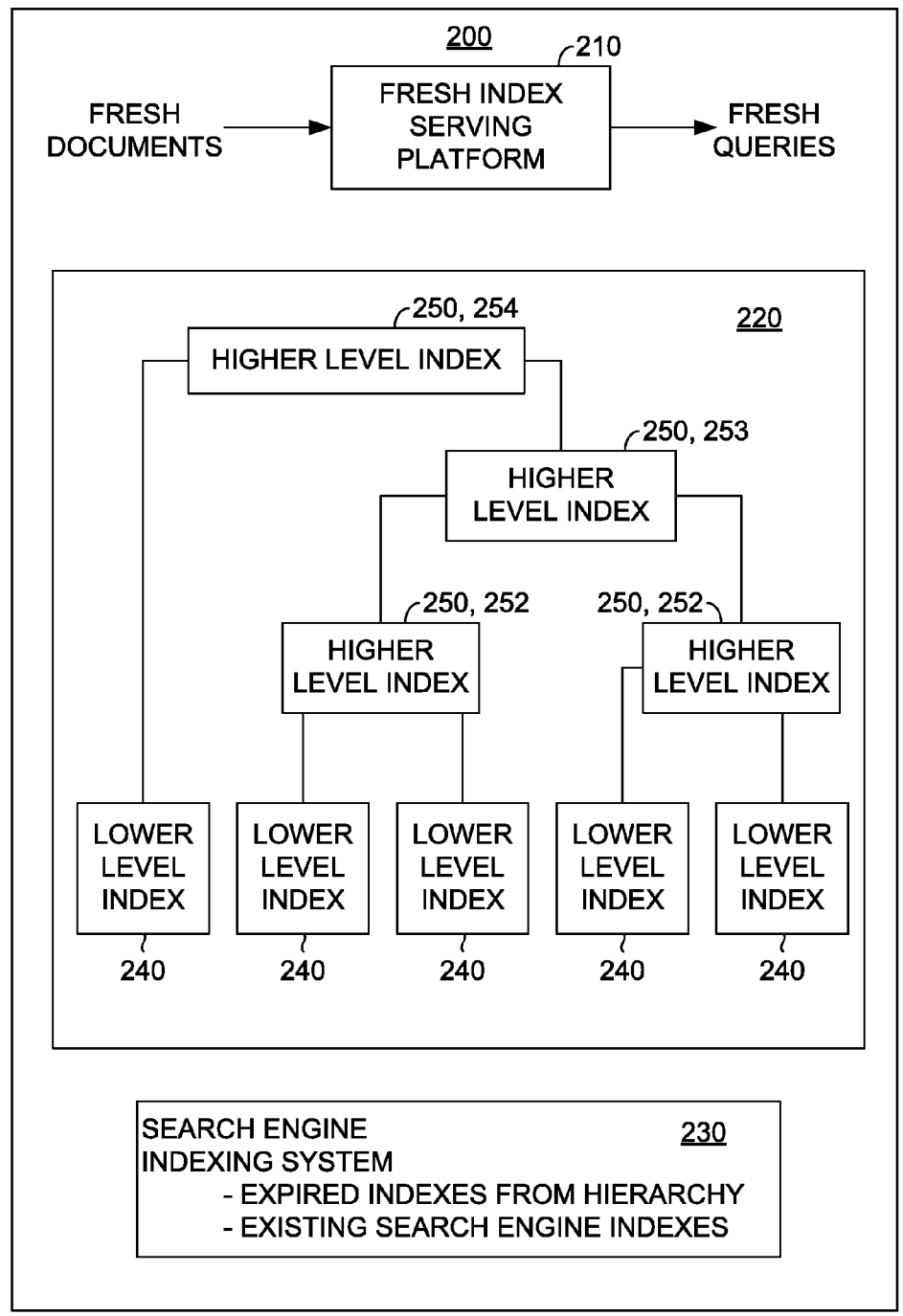
FIG. 2 is an illustration of an indexing system used in accordance with embodiments of the invention.

A system used with embodiments of the invention is illustrated in FIG. 2. An indexing system 200 contains a fresh index serving platform 210. The fresh index serving platform 210 is a large front end system designed for volume throughput. Fresh documents are continually received into the fresh index serving platform 210, while fresh queries are continually served in response to query requests.

While the fresh index serving platform 210 is receiving fresh documents and serving fresh queries, a merging process is concurrently being implemented by a single threaded merge system 220, which operates as a background or back end system in conjunction with the front end fresh index serving platform 210. The single threaded merge system 220 provides rapid indexing of fresh documents, which can be served along with previously formed indexes from a primary search engine indexing system 230. The incoming fresh document indexes are held for a certain length of time in the single threaded merge system 220 until they can be integrated into the primary search engine indexing system 230. Therefore, when a fresh document is received into the fresh index serving platform 210, it can be indexed and served within minutes as a fresh index. After the fresh index has been integrated into the primary search engine indexing system 230, there is no need to maintain it within the single threaded merge system 220, and it is removed. An example of a holding period, or lifespan for the fresh index within the single threaded merge system 220 can range from approximately one hour to one day. However, other holding periods are contemplated within embodiments of the invention. Therefore, the single threaded merge system 220 is constantly receiving, grouping, merging, and removing fresh document indexes, which will now be described in detail hereinafter.

In the single threaded merge system 220, fresh documents are grouped together into multiple lower level indexes 240. The lower level indexes 240 are grouped according to certain criteria, such as expiration time and uniform document identifiers. The expiration time is the time needed for that index to be integrated into the primary search engine indexing system 230.

It is inefficient to serve a large number of small indexes at one time, such as the multiple lower level indexes 240. However, two or more of these lower level indexes 240 can be combined into a higher level index, such as the higher level indexes 250 shown in FIG. 2. For example, ten first level indexes 240 can be merged into five second level indexes 252. As a result, five indexes would be served to the fresh index serving platform 210 instead of ten indexes, which is more efficient. The second level indexes 252 can also be merged into one or more third level indexes 253. Likewise, two or more lower level indexes 240, second level indexes 252, or third level indexes 253, or any combination of the above can be merged into a fourth level index 254. A hierarchical clustering of merged indexes is created via the single threaded merge system 220. FIG. 2 is a simplified illustration of a hierarchical clustering of merged indexes. Embodiments of the invention contemplate a greatly expanded number of lower level indexes 240, as well as a greatly expanded number of higher level indexes 250.

When a lower level index 240 expires and is therefore deleted, any higher level indexes 250 which comprise the expired lower level index 240 are also deleted. As an example, in FIG. 2, the top higher level index 254 would be deleted when the far left lower level index 240 is deleted. Therefore, it is desirable to merge indexes with proximally close, or similar expiration times, so that a relatively new index is not deleted as a result of being merged with an index that is old and near expiration. It would also be undesirable to merge an index that is about to expire with any other index, since all indexes within that particular merge would be deleted along with the soon-to-be expired index. The objective of the single threaded merge system 220 is to re-use as many indexes as possible in order to avoid re-creating indexes that have already been formed. A single machine is taken out for this merging process, so there is a minimal impact on index serving performance of the fresh index serving platform 210, which operates concurrently with the single threaded merge system 220.

The primary search engine indexing system 230 is taken offline in order to integrate the fresh indexes from the single threaded merge system 220 that are about to expire. As a result, the deleted indexes from the single threaded merge system 220 have been integrated with existing indexes to form a long term primary search engine index of the search engine indexing system 230. Therefore, the primary search engine index contains expired hierarchical clustered indexes along with previously existing search engine indexes.

Figure 3:
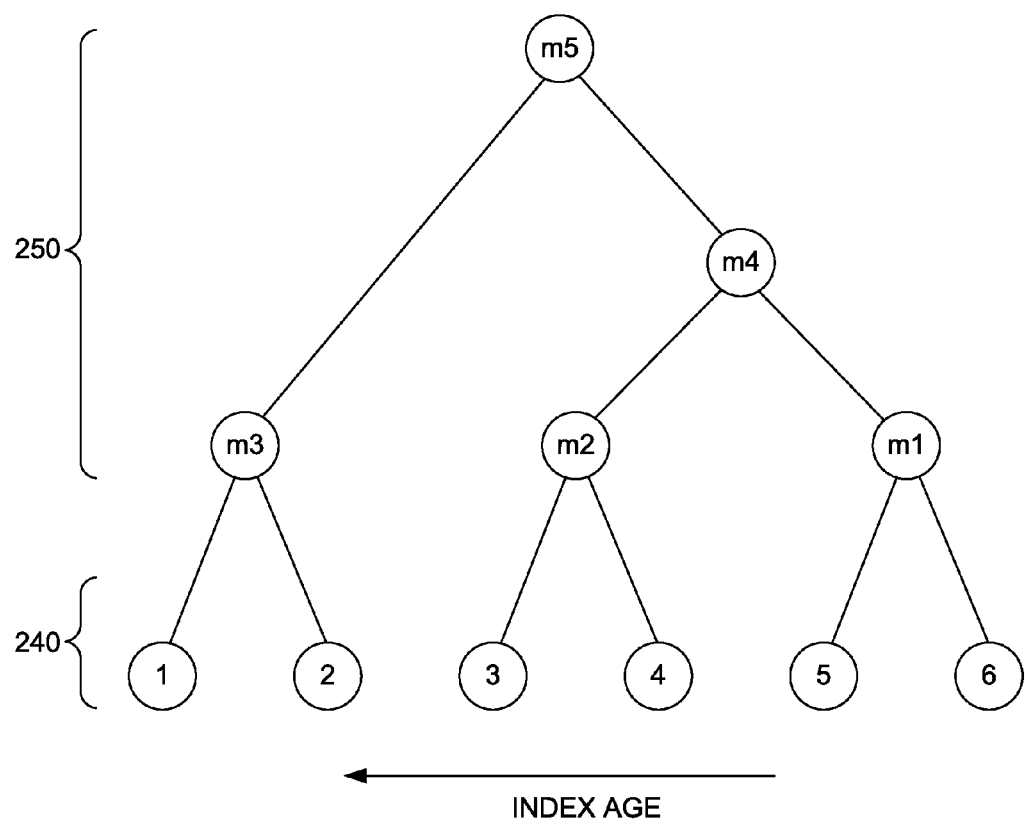
FIG. 3 is an illustration of hierarchical clustering used in accordance with embodiments of the invention.

An example of how hierarchical clustering is utilized in the single threaded merge system 220 will now be illustrated with reference to FIG. 3. The lower circles, numbered 1 through 6 represent lower level indexes 240. In FIG. 3, lower levels 1 and 2 have been merged into a higher level index 250, represented by m3, which is illustrated as a second level index. Likewise, lower levels 3 and 4 have been merged into a higher level index 250, represented by a second level index m2, and lower levels 5 and 6 have been merged into a higher level index 250, represented by a second level index m1. As illustrated in FIG. 3, the expiration times or age of the lower level indexes 240 increase from right to left; therefore, lower level index 6 is the newest index and lower level index 1 is the oldest index. Lower level index 1 will be the first index to expire and lower level index 2 will be the next index to expire. Therefore, it would be desirable to minimize merging the second level index m3, which contains lower level indexes 1 and 2, with another second level index. As a result, the newer second level indexes m2 and m1 are merged together to form a third level index m4. Finally, second level index m3 is merged with third level index m4 to create fourth level index m5.

Figure 4:
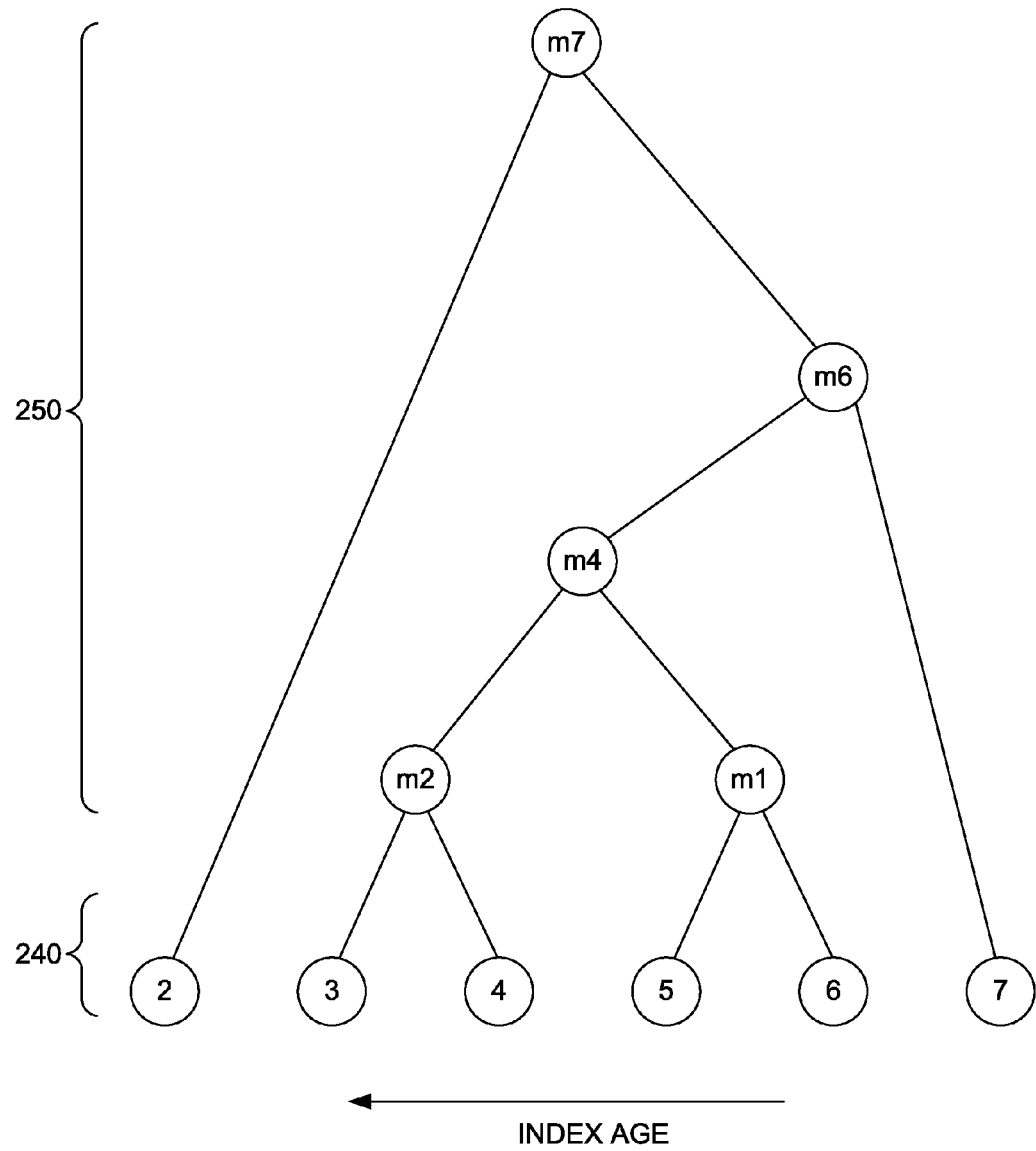
FIG. 4 is an illustration of hierarchical clustering used in accordance with embodiments of the invention.

FIG. 4 illustrates how the hierarchical clustering of the indexes might evolve when the oldest lower level index 1 expires and a new lower level index 7 is added. When lower level index 1 is removed, all higher level indexes 250 containing lower level index 1 are also removed, namely m3 and m5 (refer back to FIG. 3). This leaves lower level index 2 by itself. Newly added lower level index 7 is also by itself. Since lower level index 7 is the newest index, it would be desirable to combine the remaining indexes, represented by third level index m4 with lower level index 7, to form fourth level index m6. If third level index m4 had been merged with lower level index 2, then all of the lower level indexes 3 through 6 would be removed when lower level index 2 expired. Instead, lower level index 2 is merged with fourth level index m6 to form fifth level index m7. Therefore, when lower level index 2 expires, m7 will be the only higher level index 250 that is lost, and all of the remaining lower level indexes 240 and higher level indexes 250 can be re-used. Re-using existing indexes is much more efficient than merging all of the lower level indexes together every time, which would require recreation after a single change.

Figure 5:
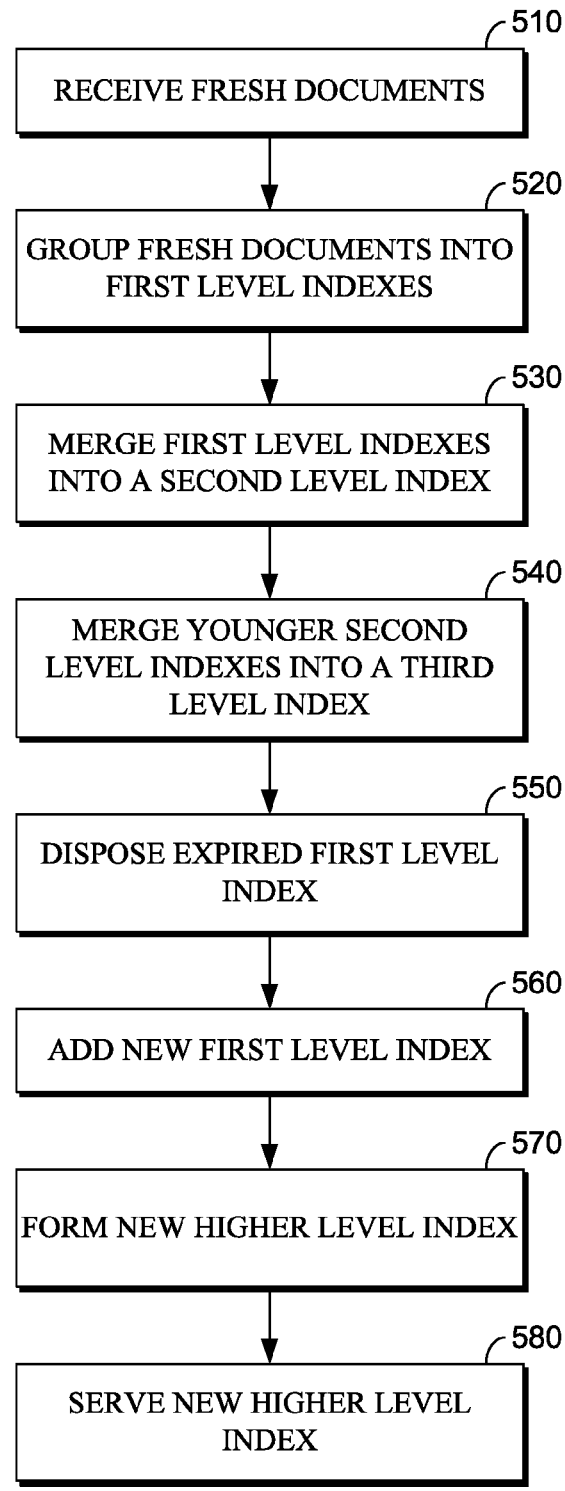
FIG. 5 is a flow diagram of indexing fresh documents as used in accordance with embodiments of the invention.

An overall process of indexing fresh documents while simultaneously serving queries from query requests can be illustrated by the flow diagram of FIG. 5. An incoming continuous stream of fresh documents is received into the fresh index serving platform in step 510. The fresh documents are grouped into first level indexes in step 520. First level indexes can also be referred to as chunks, which is the lowest level of grouping for fresh documents. As an example, which is not limited herein by, a first level index may contain approximately 65,000 documents. However, there is no limit on the number of documents contained in a higher level index. Each fresh document has a uniform document identifier. All documents within a first level index will have similar document identifiers, but a higher level index will most likely have dissimilar document identifiers since the higher level index comprises multiple first level indexes. Therefore, as an example, the incoming fresh documents are grouped into first level indexes according to uniform document identifiers in step 520.

The first level indexes will then be merged into one or more second level indexes in step 530, where each second level index contains two or more first level indexes with similar expiration times. As described above, the expiration time of an index is the length of time necessary for the index to be integrated into the primary search engine index, prior to being deleted from the single threaded merge system. As an example, the expiration time can range from approximately one hour to one day. In step 540, at least two second level indexes are merged into a third level index. In step 550, an expired first level index is disposed of, as well as any higher level indexes which contain the expired first level index. All other lower level indexes and higher level indexes which do not contain the expired first level index are kept and re-used. A new first level index is added in step 560. A new higher level index is formed in step 570, which contains the new first level index merged with an existing index. The existing index could be either a lower level index or a higher level index. The new higher level index is then served to the fresh index serving platform in step 580. Forming a hierarchical clustered index is a continuous process of adding new documents, removing expired documents, and re-using existing un-expired documents.

Serving a single index to the fresh index serving platform is the most efficient serving method. However, the cost of merging existing indexes to form new indexes needs to be weighed against the cost of serving multiple indexes at one time. Factors that may influence determining when to merge indexes include how much computer processing unit (cpu) time is available and maintaining enough resources for merging. As previously stated, it is undesirable to merge an index that is near expiration, since the other indexes merged with the soon-to-be expired index will also be deleted at that time. An embodiment of the invention also includes one or more computer-readable storage media containing computer readable instructions embodied thereon that, when executed by a computing device, perform the method described above with reference to FIG. 5.

Figure 6:
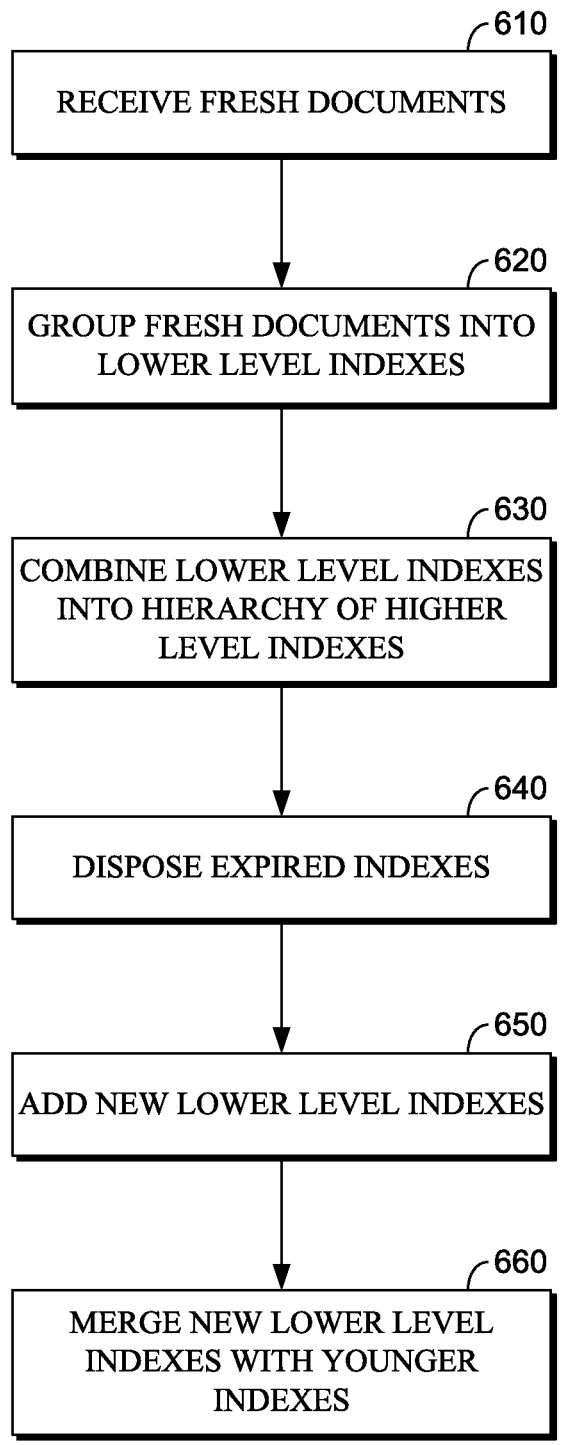
FIG. 6 is a flow diagram of indexing fresh documents as used in accordance with embodiments of the invention.

Another embodiment of the invention includes one or more computer-readable storage media containing computer readable instructions embodied thereon that, when executed by a computing device, perform a method of optimizing a search engine index, as described below with reference to FIG. 6. An incoming stream of fresh documents are received by a fresh index serving platform in step 610, wherein the fresh index serving platform also serves fresh queries in response to query requests. The received fresh documents are grouped into a plurality of lower level indexes according to their respective expiration times in step 620. The expiration time, or the lifespan of each of the lower level indexes spans a length of time required for the lower level index to be integrated with a primary search engine index of a primary search engine indexing system. Some of the lower level indexes are combined to form higher level indexes, and some of those higher level indexes can be combined with a lower level index or another higher level index to form a still higher level index. This results in the formation of a hierarchy of higher level indexes at multiple levels in step 630. The hierarchy is formed in such a way that the younger indexes are repetitively merged to reach a higher level within the hierarchy, whereas the older indexes are merged less and reside at a lower position within the hierarchy, while the soon-to-be expired indexes are not merged at all with other indexes. An attempt is made to merge each index with another index having a proximally close expiration time. When an index expires, it is disposed of, along with all higher level indexes which comprise the expired index in step 640. New lower level indexes are added in step 650. These new lower level indexes are merged with the younger existing indexes to form new higher level indexes in step 660.

A merge can occur between two or more lower level indexes, between a lower level index and a higher level index, between two or more higher level indexes at the same index level, or between two or more higher level indexes at different index levels within the hierarchy. FIG. 4 was previously described as an example of the multiple higher levels formed within a hierarchy of clustered indexes. This process results in maximizing the re-use of existing indexes while minimizing formation of new indexes. This process is implemented by a single threaded merge system, which works concurrently with the fresh index serving platform to serve queries.

One or more of the top indexes within the hierarchy are served to the fresh index serving platform. The number of indexes to serve at any one time is determined by a balance between the cost of merging indexes and the cost of serving multiple indexes.

Many different arrangements of the various components depicted, as well as embodiments not shown, are possible without departing from the spirit and scope of the invention. Embodiments of the invention have been described with the intent to be illustrative rather than restrictive.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A computer-implemented method of simultaneously serving queries and indexing fresh documents using a computing system having processor, memory, and data storage subsystems, the method comprising:
   receiving an incoming stream of fresh documents;
   grouping the incoming stream of fresh documents into first level indexes according to uniform document identifiers via the processor of the computing system;
   merging at least two of the first level indexes with similar expiration times into a second level index;

merging at least two younger second level indexes into a third level index;

disposing an expired first level index and all higher level indexes comprising the expired first level index, while keeping all higher level indexes comprising un-expired first level indexes;

adding a new first level index;

forming a new higher level index comprising the new first level index merged with an existing index; and serving the new higher level index to a fresh index serving platform.

2. The computer-implemented method of claim 1, further comprising: merging the incoming stream of fresh documents with existing documents via a single threaded merge process to form a hierarchical clustered index.

3. The computer-implemented method of claim 2, wherein forming the hierarchical clustered index comprises a continuous process of adding new documents, removing expired documents, and re-using existing un-expired documents.

4. The computer-implemented method of claim 2, wherein the merging the incoming stream of fresh documents via the single threaded merge process occurs concurrently with serving fresh queries via the fresh index serving platform.

5. The computer-implemented method of claim 1, wherein an optimal time to merge two or more indexes is contingent upon computer processing unit (cpu) time available and expiration times of each of the two or more indexes.

6. The computer-implemented method of claim 1, wherein selecting indexes to merge is contingent upon maximizing re-use of existing indexes and minimizing formation of new indexes.

7. The computer-implemented method of claim 1, wherein a lifespan of the first level index spans a length of time required for integration of the first level index with a primary search engine index.

8. The computer-implemented method of claim 7, wherein the lifespan of the first level index ranges from one hour to one day.

9. A computer-implemented indexing system having processor, memory, and data storage subsystems, the computer-implemented indexing system comprising:

a fresh index serving platform for receiving an incoming stream of fresh documents and simultaneously serving fresh queries via the processor of the computer-implemented indexing system;

a plurality of lower level indexes of the fresh documents, grouped according to uniform document identifiers and expiration times of the fresh documents;

one or more higher level indexes, comprising two or more merged lower level indexes served to the fresh index serving platform;

a hierarchical clustering of the plurality of lower level indexes and the one or more higher level indexes merged via a single threaded merge system; and a search engine indexing system comprising a long term primary index of expired indexes from the hierarchical clustering integrated with existing search engine indexes via the processor of the computer-implemented indexing system.

10. The computer-implemented indexing system of claim 9, wherein the fresh index serving platform and the single threaded merge system operate concurrently.

11. The computer-implemented indexing system of claim 9, wherein a lifespan of each of the lower level indexes spans a length of time required to merge each of the respective lower level indexes with the long term primary index.

12. The computer-implemented indexing system of claim 11, wherein the length of time ranges from one hour to one day.

13. The computer-implemented indexing system of claim 9, wherein each of the higher level indexes comprise lower level indexes with proximally close expiration times.

14. The computer-implemented indexing system of claim 13, wherein a first higher level index comprises a newly formed lower level index and a second higher level index comprises a lower level index near expiration.

15. One or more computer-readable storage media containing computer readable instructions embodied thereon that, when executed by a computing device, perform a method of optimizing a search engine index, the method comprising:

receiving an incoming stream of fresh documents;

grouping the fresh documents into a plurality of lower level indexes according to their respective expiration times;

combining some of the plurality of lower level indexes into a hierarchy of higher level indexes, wherein younger indexes are merged to a higher level within the hierarchy and soon-to-expire indexes are not merged with other indexes;

disposing any expired indexes and all higher level indexes which comprise the expired indexes;

adding one or more new lower level indexes; and merging the one or more new lower level indexes with one or more of the younger indexes within the hierarchy.

16. The computer-readable storage media of claim 15, wherein the combining is contingent upon available resources, maximizing re-use of existing indexes, and minimizing formation of new indexes.

17. The computer-readable storage media of claim 15, wherein the method of optimizing a search engine index operates via a single threaded process and operates concurrently with serving queries via a fresh index serving platform.

18. The computer-readable storage media of claim 17, further comprising: serving one or more top indexes within the hierarchy to the fresh index serving platform.

19. The computer-readable storage media of claim 15, wherein each of the higher level indexes comprise lower level indexes with proximally close expiration times.

20. The computer-readable storage media of claim 15, wherein a lifespan of each of the lower level indexes spans a length of time required for integration of the lower level indexes with a primary search engine index.

* * * * *